Figure 1:
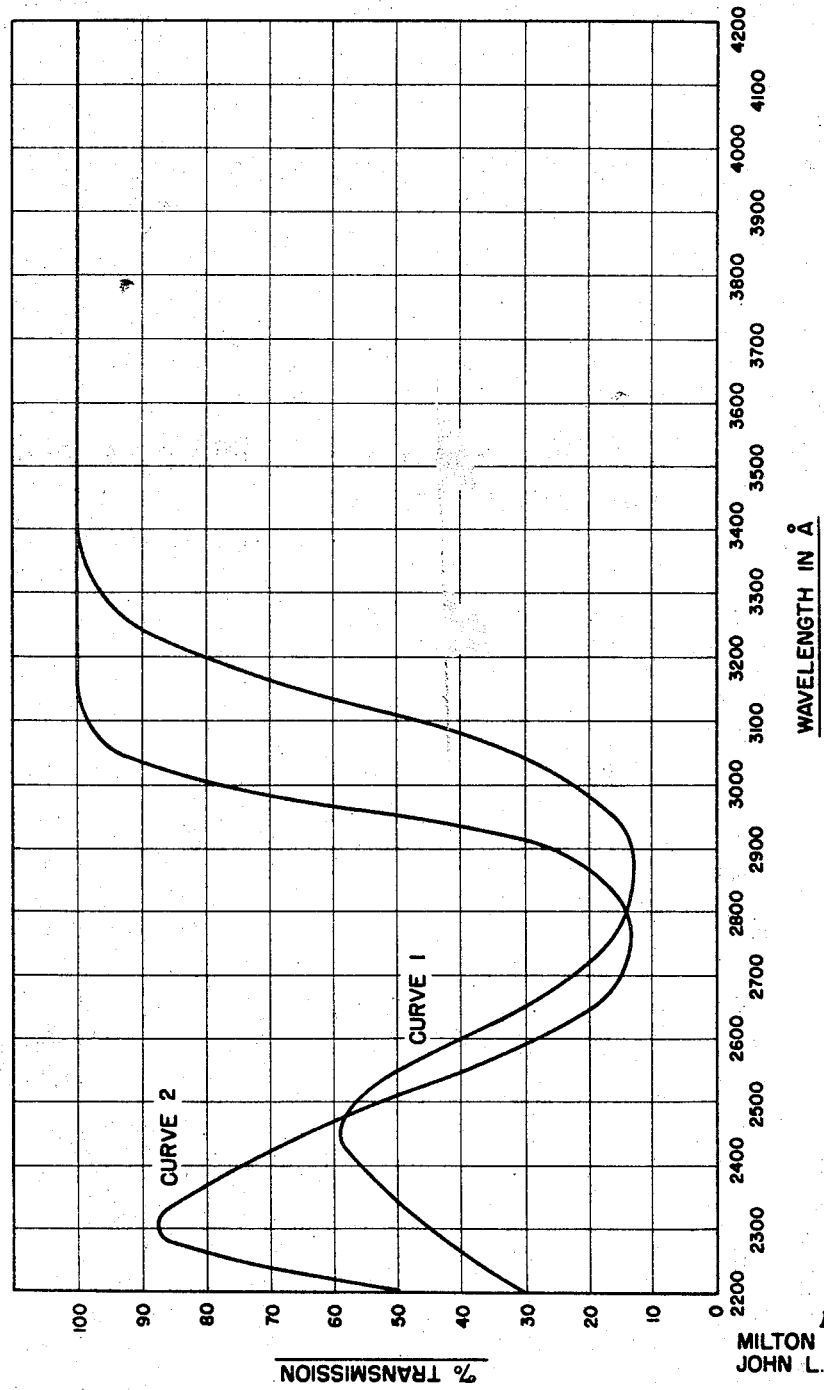

INVENTORS.
MILTON E. ABRAHAM &
JOHN L. SMITH 3,175,950
SUNSCREENING PREPARATIONS
Milton E. Abraham, Cresskill, and John L. Smith, East Orange, N.J., assignors, by mesne assignments, to Armour Pharmaceutical Company, Chicago, Ill., a corporation of Delaware
Filed July 22, 1960, Ser. No. 44,618
4 Claims. (Cl. 167—90)

This invention relates to a process of protecting the skin against the burning effect of ultra-violet light of short wavelength, while transmitting a proportion of this light as well as light of longer wavelength to promote tanning, and to sunscreens for use in this process, and to a process for preparing such sunscreens.

Pigmentation or tanning is produced by light in the ultra-violet spectrum of wavelengths ranging from 2950 to 3850 A. Light of wavelengths ranging from 2950 to 3150 A., 2970 A. being the most potent, at a sufficient intensity produces an erythema within a few hours. This range is therefore called the "burning band." Light of wavelengths from 3300 to 3850 A., especially 3460 to 3650 A., produces an apparent direct tanning after exposure of sufficient duration and intensity without an accompanying erythema. Hence, the objective of every sunscreen is to reduce light in the 2950 to 3150 A. range to the point where tanning but not burning is obtained, while transmitting as much light as possible beyond 3150 A. to obtain the tanning action of such light as well.

Many substances, for example, benzyl salicylate, menthyl salicylate, glyceryl monosalicylate, umbelliferone acetic acid, and quinine oleate, heretofore proposed as sunscreens, although capable of absorbing ultra-violet light in the "burning band," in order to be effective must be used in large and expensive concentrations, and may as a result cause physiological disturbances when applied to the body. The ethyl, propyl and butyl esters of para-aminobenzoic acid are local anesthetics, and are accordingly inadvisable for use as sunscreens.

The sunscreens of the invention are effective in preventing burning while facilitating tanning without an accompanying physiological effect. These sunscreens absorb most of the ultraviolet light having a wavelength from 2950 A. to 3150 A. and have as the principal chromophoric group a benzanilide nucleus

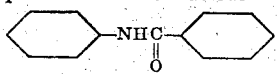

One or more resonating groups can be attached to a ring carbon atom of the benzanilide nucleus. Such resonating groups modify the ultraviolet light absorption characteristics of the benzanilide nucleus. Chromophores are exemplary of resonating groups.

This resonating group may be, for example, a carbonyloxy group

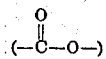

in which event the sunscreens have the formula:

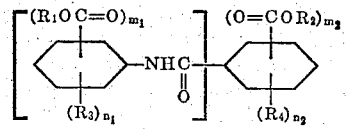

In addition to or in lieu of a carbonyloxy group, an alkoxy group can be attached to the ring, in which event the sunscreens have the formula:

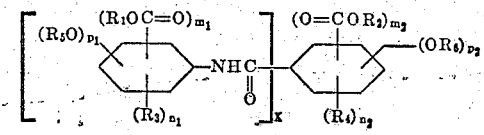

The

and R groups are attached at any position in either or both of the benzene rings.

$m_1$ and $m_2$ are numbers ranging from 0 to 1, at least one of $m_1$ and $m_2$ being 1.

$p_1$ and $p_2$ are numbers ranging from 0 to 4, at least one of $p_1$ and $p_2$ being 1.

$x$ is a number ranging from 1 to 5.

$R_1$ and $R_2$ are selected from the group consisting of hydrogen, alkyl radicals having from 1 to 18 carbon atoms, alkenyl radicals having from 2 to 18 carbon atoms, hydroxyalkyl radicals having from 2 to 18 carbon atoms and from one to six hydroxyl groups, partially and completely etherified and esterified, such hydroxyalkyl radicals having from 3 to 30 carbon atoms, and from one to six ester or ether groups, and hydroxyoxyalkylene glycols and polyoxyalkylene glycol alkyl monoethers and acyl monoesters having from 1 to about 40 oxyalkylene units, the oxyalkylene units having from 2 to 18 carbon atoms. The alkyl ether and acyl ester radical, if present, has from 1 to 18 carbon atoms.

$R_3$ and $R_4$ are selected from the group consisting of alkyl radicals having from 1 to 6 carbon atoms, and aryl and mixed alkyl aryl radicals having from 6 to 18 carbon atoms, and $n_1$ and $n_2$ are numbers ranging from 0 to 4. In the preferred embodiments, $n_1$ and $n_2$ are zero, and one of $m_1$ and $m_2$ is 1.

$R_5$ and $R_6$ are alkyl radicals having from 1 to 6 carbon atoms, and $p_1$ and $p_2$ are numbers ranging from 0 to 4.

Exemplary of the $R_1$ and $R_2$ alkyl radicals are methyl, ethyl, n-propyl, n-butyl, n-amyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, and the various positional isomers thereof, such as, for example, isopropyl, isobutyl, t-butyl, sec-butyl, isoamyl, t-amyl, isohexyl, t-heptyl, isooctyl, 2-ethyl hexyl, t-octyl, t-nonyl, and t-decyl.

Exemplary of $R_1$ and $R_2$ alkenyl radicals are ethenyl, $\Delta^1$-propenyl, $\Delta^2$-propenyl (i.e., allyl), isopropenyl; $\Delta^1$-butenyl, $\Delta^2$-butenyl, $\Delta^3$-butenyl, and the corresponding isomers thereof, such as, for example, $\Delta^1$-isobutenyl, $\Delta^2$-isobutenyl, $\Delta^1$-sec-butenyl and $\Delta^2$-sec-butenyl; $\Delta^1$-pentenyl, $\Delta^2$-pentenyl, $\Delta^3$-pentenyl, $\Delta^4$-pentenyl, and the corresponding isomers thereof, including 2-methyl-$\Delta^1$-butenyl, 2-methyl-$\Delta^2$-butenyl and 1,1-dimethyl-$\Delta^2$-propenyl; $\Delta^1$-hexenyl, $\Delta^2$-hexenyl, $\Delta^3$-hexenyl, $\Delta^4$-hexenyl, $\Delta^5$-hexenyl and the corresponding isomers thereof, including 3,3-dimethyl-$\Delta^1$-butenyl, 2,3-dimethyl-$\Delta^1$-butenyl, 2,3-dimethyl-$\Delta^2$-butenyl, 2,3-dimethyl-$\Delta^3$-butenyl, and 1-methyl-1-ethyl-$\Delta^2$-propenyl; and similarly the various positional isomers of heptenyl, octenyl, nonenyl, decenyl, undecenyl, dodecenyl, tridecenyl, tetradecenyl, pentadecenyl, hexadecenyl, heptadecenyl and octadecenyl.

Typical $R_1$ and $R_2$ hydroxyalkyl radicals are hydroxyethyl, 2-hydroxypropyl, 3-hydroxypropyl, 2-hydroxybutyl, 3-hydroxybutyl, 4-hydroxybutyl, and the various positional isomers thereof, such as, for example, 3-hydroxy-2-methylpropyl, 2-hydroxy-2-methylpropyl and 2-hydroxy-1,1-dimethylethyl, and similarly the various positional isomers of hydroxyamyl, hydroxyhexyl, hydroxyheptyl, hydroxyoctyl, such as 3-hydroxy-2-ethylhexyl, hydroxynonyl, hydroxydecyl, hydroxyundecyl, hydroxydodecyl, hydroxytridecyl, hydroxytetradecyl, hydroxypentadecyl, hydroxyhexadecyl, hydroxyheptadecyl, hydroxyoctadecyl, glyceryl, 3,4-dihydroxybutyl, erythrityl, mannityl and sorbityl.

Etherified hydroxyalkyl radicals having one or more ether groups include, for example, glyceryl monostearyl ether, glyceryl monomethyl ether, glyceryl monobenzyl ether, glyceryl dibutyl ether, glyceryl dioleyl ether, erythrityl monoethyl ether, erythrityl diisopropyl ether, erythrityl monomyristyl ether, erythrityl dioleyl ether. Exemplary esterified hydroxyalkyl radicals include hydroxyalkyl radicals having one or more of the hydroxyls esterified, with an aliphatic, aromatic or cycloaliphatic acid, the acid having from one to eighteen carbon atoms, such as glyceryl monostearate, glyceryl distearate, glycerylmonobenzoate, glyceryl monobutyrate, glyceryl dicaprylate, glyceryl monoacrylate, glyceryl diacetate, glyceryl monooleate, glyceryl monomyristate, erythrityl monoacetate, erythrityl diacetate, erythrityl monostearate, and erythrityl distearate.

The $R_1$ and $R_2$ hydroxyoxyalkylene radicals are derived by esterification with polyoxyalkylene glycols, such as polyoxyethylene glycol, polyoxy-1,2-propylene glycol, diethylene glycol, diethylene glycol monomethyl ether, triethylene glycol, tetraethylene glycol, dipropylene glycol, tripropylene glycol, triethylene glycol monostearyl ester, tripropylene glycol monodecyl ether, tetrapropylene glycol, dibutylene glycol, tributylene glycol, tetrabutylene glycol, polyoxypropyleneoxyethylene glycol, polyoxybutyleneoxypropylene glycolpolyoxybutylene oxypropylene glycol and polyoxyethyleneoxybutylene glycol, having from 1 to 40 oxyalkylene units.

Exemplary of the $R_3$, $R_4$, $R_5$ and $R_6$ alkyl radicals having from one to six carbon atoms are methyl, ethyl, n-propyl, n-butyl, n-amyl, n-hexyl and the various positional isomers thereof, such as for example, isopropyl, isobutyl, t-butyl, sec-butyl, isoamyl, t-amyl, isohexyl, and t-hexyl.

Exemplary of the $R_3$ and $R_4$ aryl and mixed alkyl aryl radicals having from six to eighteen carbon atoms are phenyl, diphenyl, α-naphthyl, β-naphthyl, α-anthryl, β-anthryl, γ-anthryl and the like, including the various monovalent radicals of such aromatics as indene, isoindene, acenaphthene, fluorene, phenanthrene, naphthacene, chrysene, pyrene, triphenylene and the like. Mixed alkyl aryl radicals such as o-tolyl, m-tolyl, p-tolyl, 2,3-xylyl, 2,4-xylyl, 2,5-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 1-ethyl-β-naphthyl, 5-ethyl-β-naphthyl, 2,3 - dipropyl-α-naphthyl, 5,8-diisopropyl-β-naphthyl, benzyl, α-phenyl-ethyl, β-phenyl-ethyl, α-phenyl-propyl, γ-phenyl-propyl, β-phenyl-isopropyl, α'-naphthyl-methyl, β'-naphthyl-methyl and the like.

The following sunscreens are examples of the invention:

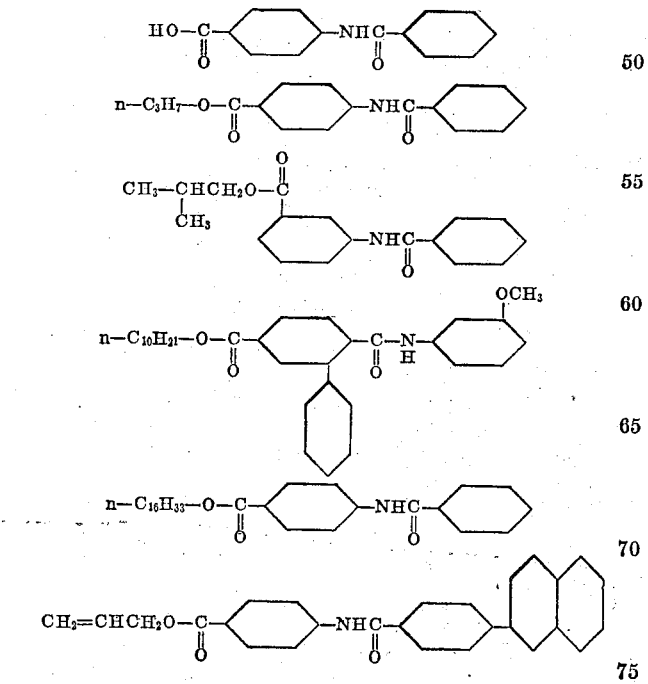

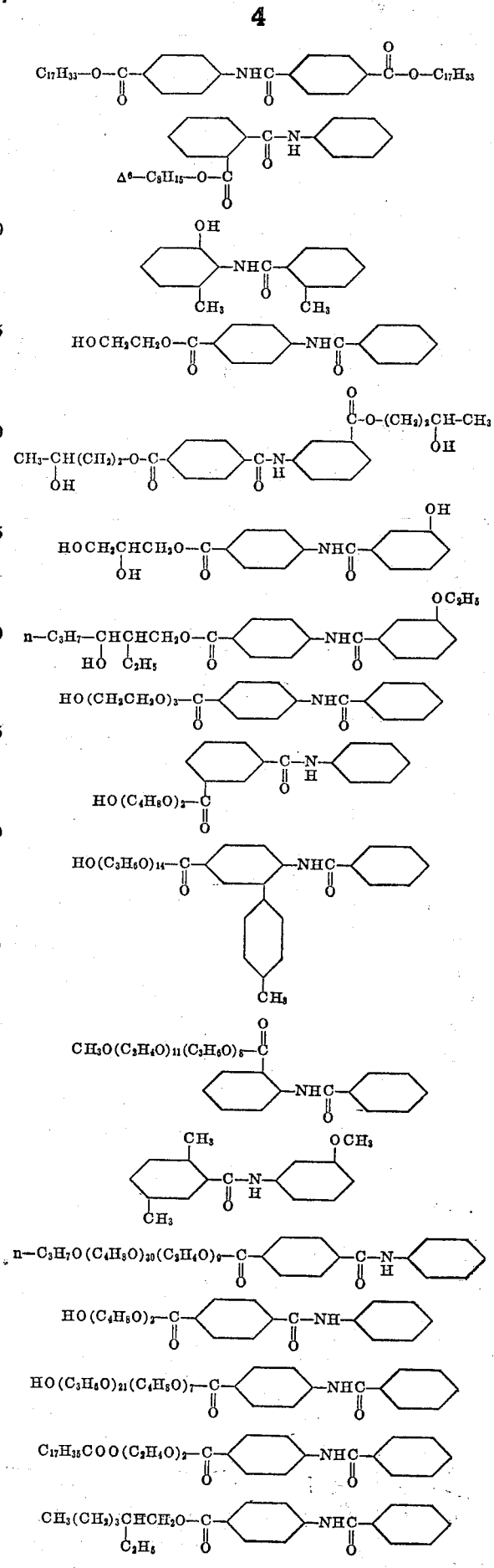

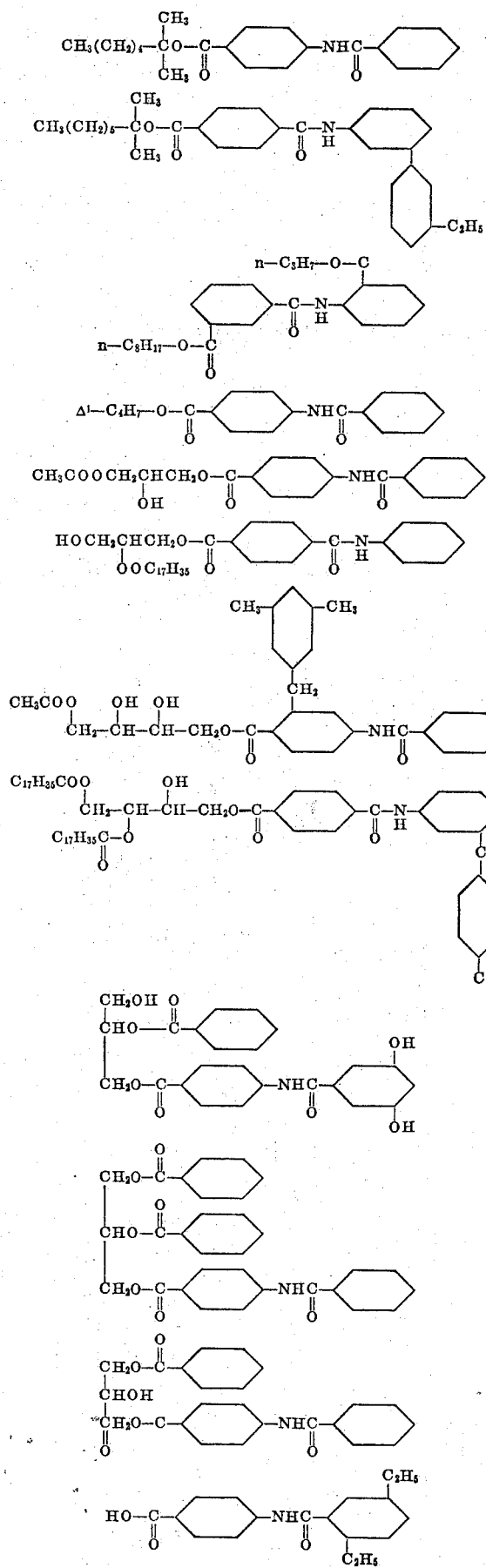
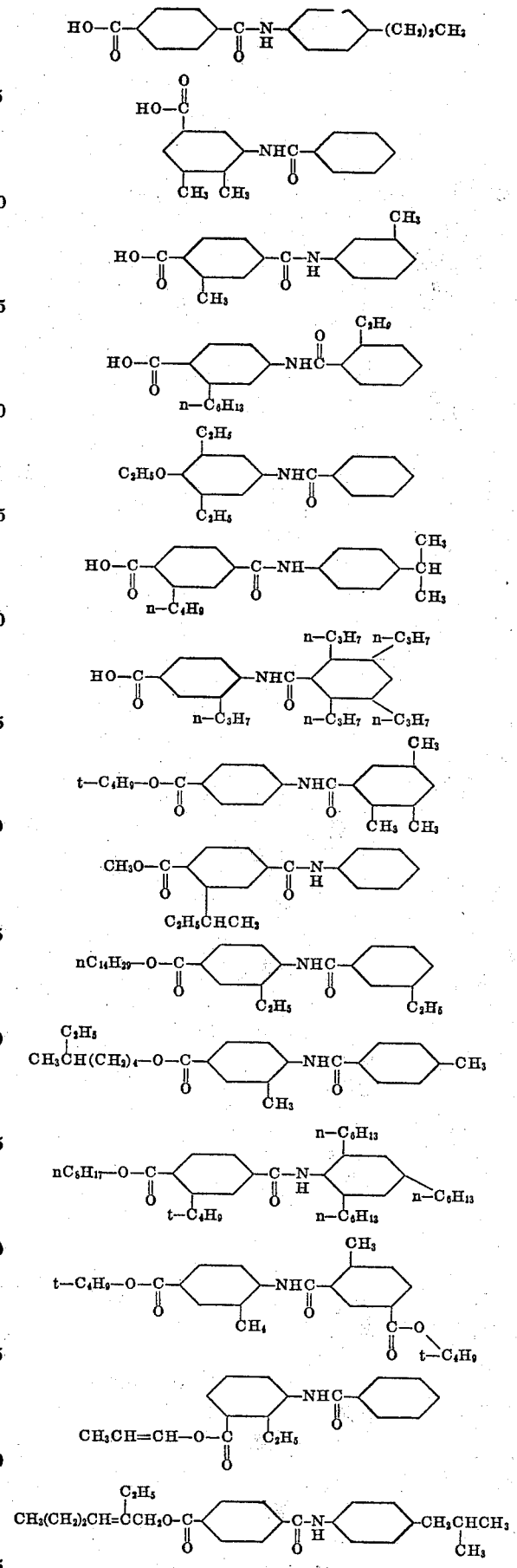

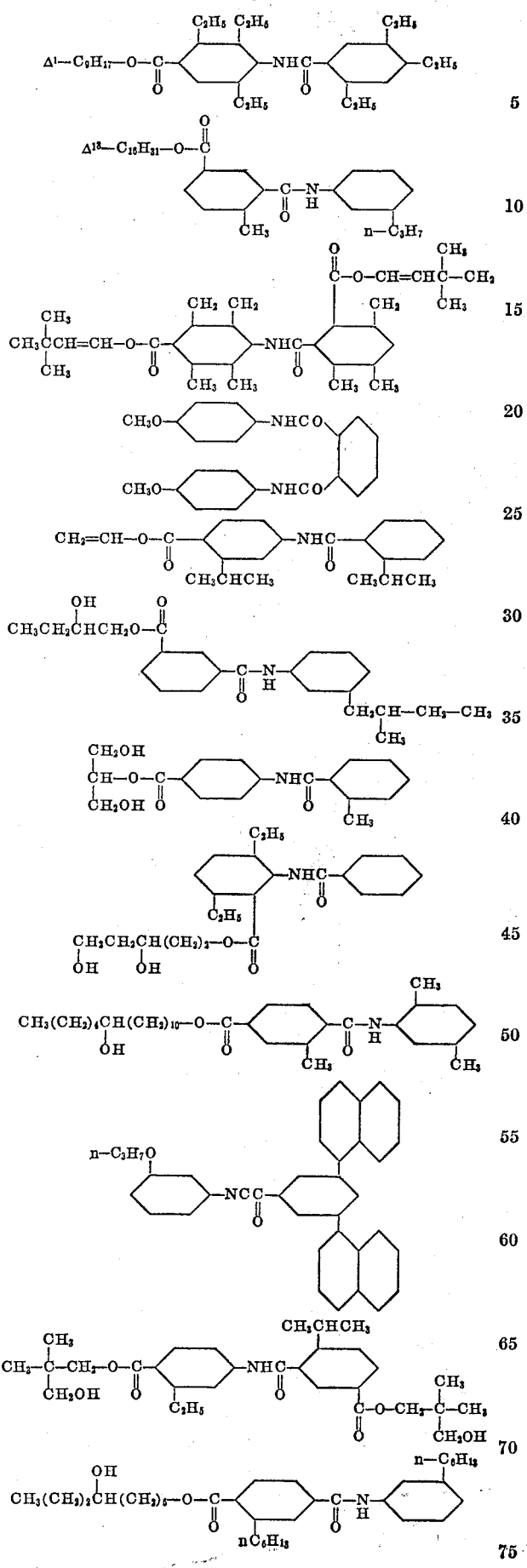
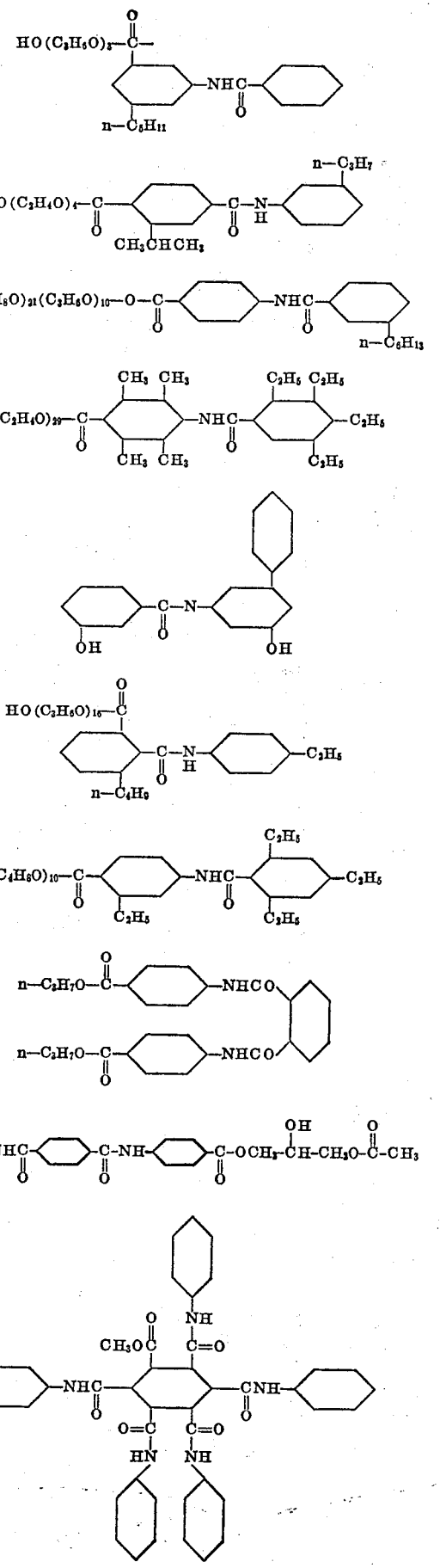

The sunscreens of the invention can be formed by the reaction of an aniline compound having an active amino hydrogen (e.g., aniline or an amino benzoic acid or ester) with a benzene compound having a carbonyl halide group (e.g. benzoyl chloride, phthalyl chloride, terephthalyl chloride, etc.) to produce the corresponding benzanilide. The reactants can contain substituents, such as a carbonyloxy group

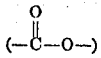

as indicated previously attached to a ring carbon atom of either the aniline compound or the benzene compound having a carbonyl halide group. The acid halide liberated is neutralized or removed. This reaction can be represented as follows:

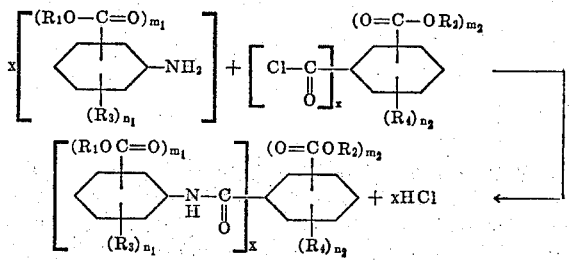

wherein $R_1$, $R_2$, $R_3$, $R_4$, $m_1$, $m_2$, $n_1$, $n_2$ and $x$ are as defined heretofore.

This reaction is a well known type of amide formation. However, in the case of the sunscreens of the invention, it is quite difficult using the conventional techniques to separate the reaction product in good yield. In accordance with the invention, the reaction is driven towards completion and separation of the product facilitated by carrying out the reaction in an organic solvent which is a good solvent for the reactants and a nonsolvent for the reaction product. Preferably, the solvent is a nonsolvent for the reaction product even at reaction temperature so that the product is removed from the reaction system as it is formed.

Aromatic and aliphatic hydrocarbon solvents as a class meet these requirements, such as toluene, xylene, benzene, mesitylene, p-cumene, ethylbenzene, pentane, hexane, octane, decane, and dodecane.

The reaction takes place at an elevated temperature within the range of from about 50 to about 90° C., and is usually complete in approximately 30 minutes to three hours. In order to neutralize the halide acid formed during the reaction, an alkaline salt such as sodium carbonate in aqueous solution can be added. The acid can also be removed by distillation with the solvent. The product can be recrystallized from an alcohol, such as ethanol, or a ketone, such as acetone.

In some cases, the above reactants are insoluble in aromatic and aliphatic hydrocarbons. The reaction products can then be prepared by esterification of the corresponding benzamido benzoic acid with an alcohol:

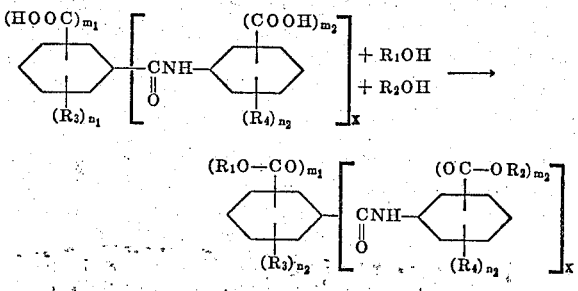

The corresponding benzoyl halide can be prepared first, if the esterification is slow, using conventional techniques.

The following specific examples illustrate the process of the invention:

EXAMPLE A

To 59.6 g. butyl p-aminobenzoate was added 68 ml. toluene. Solution was effected by heating the agitated slurry to 25° C. 43.3 g. of benzoyl chloride dissolved in 42 ml. toluene was next added over a period of 6 minutes, the maximum temperature reached being 65° C.

The resultant mixture was brought to 80° C. and held at this temperature for 30 minutes. 12 g. of sodium carbonate dissolved in 58 ml. of water was added with constant agitation, making the upper toluene layer slightly alkaline (pH 8).

The lower aqueous layer was withdrawn, and the upper toluene layer was heated to 80° C. and washed at this temperature with two successive 300 ml. portions of deionized water. After the second washing, the toluene layer was withdrawn and allowed to cool to room temperature (25° C.). After solidification, which took place during the cooling, was complete, the excess toluene was drawn off in a Büchner funnel. The yield after drying the product overnight at 65° C. was found to be 89.3 g., or 93% of theoretical.

Recrystallization of the product from acetone gave a material with a melting point of 102° C.

EXAMPLE B

To 304 ml. of toluene was added 193.2 g. of isobutyl p-aminobenzoate. Agitation was used to produce a clear solution at room temperature (26° C.).

To this solution was added 140.6 g. (116 ml. of benzoyl chloride made up to 250 ml. with toluene, the reaction mixture being agitated vigorously during this addition. The total time of addition was 32 minutes, and the maximum temperature reached was 70° C.

The temperature was raised to 80° C. and held for 30 minutes; then 64 g. of anhydrous sodium carbonate in 360 ml. of water added with agitation to give a pH of 10 in the toluene phase.

The layers were allowed to separate. The lower aqueous layer was withdrawn and the toluene layer was washed with 300 ml. of water. During the washing the temperature was kept at 80° C. to prevent crystallization of the product. The lower aqueous layer was discarded and the toluene layer was cooled to room temperature and vacuum filtered, the crystalline product being dried at 50° C. overnight.

The yield was 260.0 gms., an 87.5% yield based upon the iso-butyl p-aminobenzoate.

Melting point range was 121–129° C.

EXAMPLE C 277.4 g. n-decyl p-aminobenzoate was dissolved in 870 ml. toluene by heating the slurry to 44° C. To this clear solution was added 140.6 g. benzoyl chloride, dissolved in 130 ml. toluene, over a period of 5 minutes. A temperature of 85° C. was reached and a very heavy viscous slurry obtained. 200 ml. of toluene was added to reduce the viscosity to a workable figure.

A temperature of 88° C. was obtained by heating and held for a period of 30 minutes, after which a washing and neutralizing operation was undertaken with 100 ml. of a 20% aqueous sodium carbonate solution. A pH of 7 was obtained in the upper toluene layer. The lower aqueous layer was withdrawn, and the upper layer was washed with 100 ml. of water at 88° C.

The upper toluene layer gelled following separation and cooling to room temperature (25° C.). However, on standing overnight, a fatty noncrystalline material was obtained. Yield after filtration and drying under 25 lbs. vacuum at 50° C. was 381.5 g. or 91% of theoretical. The product had a melting point of 92–94° C., and on recrystallizing from acetone, the melting point was 92.5–93.5° C.

The sunscreens of the invention are crystalline in nature when $R_1$ or $R_2$ is less than 10 carbon atoms and when $R_1$ or $R_2$ is 10 or more carbon atoms the sunscreens are waxy or paste-like materials. The crystalline compounds melt at a temperature above atmospheric temperatures. Many of the waxy or paste-like compounds melt at the skin temperature, which is advantageous in the film formation thereon. These sunscreens exhibit a maximum ultra-violet absorption (over 90%) between 2800 to 3000 A., and sufficient absorption within the entire "burning band," the region of maximum erythemogenic effect, to prevent burning, while transmitting enough light, particularly beyond 3150, to obtain adequate beneficial tanning. The sunscreens are quite soluble in acetone and amyl acetate, and sufficiently soluble or dispersible in alcohols (e.g., methanol, ethanol, isopropanol, n-butanol) and the ethylene glycol monoalkyl ethers (e.g., ethylene glycol monomethyl ether and ethylene glycol monobutyl ether) and water, to permit formulation of lotions and creams for application to the skin.

While all the sunscreens encompassed by the general formula heretofore set forth exhibit excellent ultra-violet light screening properties, certain sunscreens are preferred over others. Sunscreens in which $R_1$ or $R_2$ is an alkyl or alkenyl radical containing 10 or more carbon atoms are waxy or paste-like compounds which are advantageous because they are better film-formers, and therefore are preferred in to the manufacture of many sunscreen compositions. The sunscreens in which $R_1$ or $R_2$ has a hydroxy group, or an ester or ether group, are more easily dispersible in water and aqueous alcohol solutions than the alkyl or alkenyl-containing compounds, and like lotion, cream and paste bases, which are preferred bases, and therefore have a distinct advantage over such compounds.

Quite unlike the aminobenzoates known heretofore as sunscreens, the sunscreens of the invention are devoid of any local anesthetic effect. This is due to substitution of the aromatic group on the amido nitrogen. These sunscreens also display little or no tendency to stain the skin or clothing.

Figure 2:
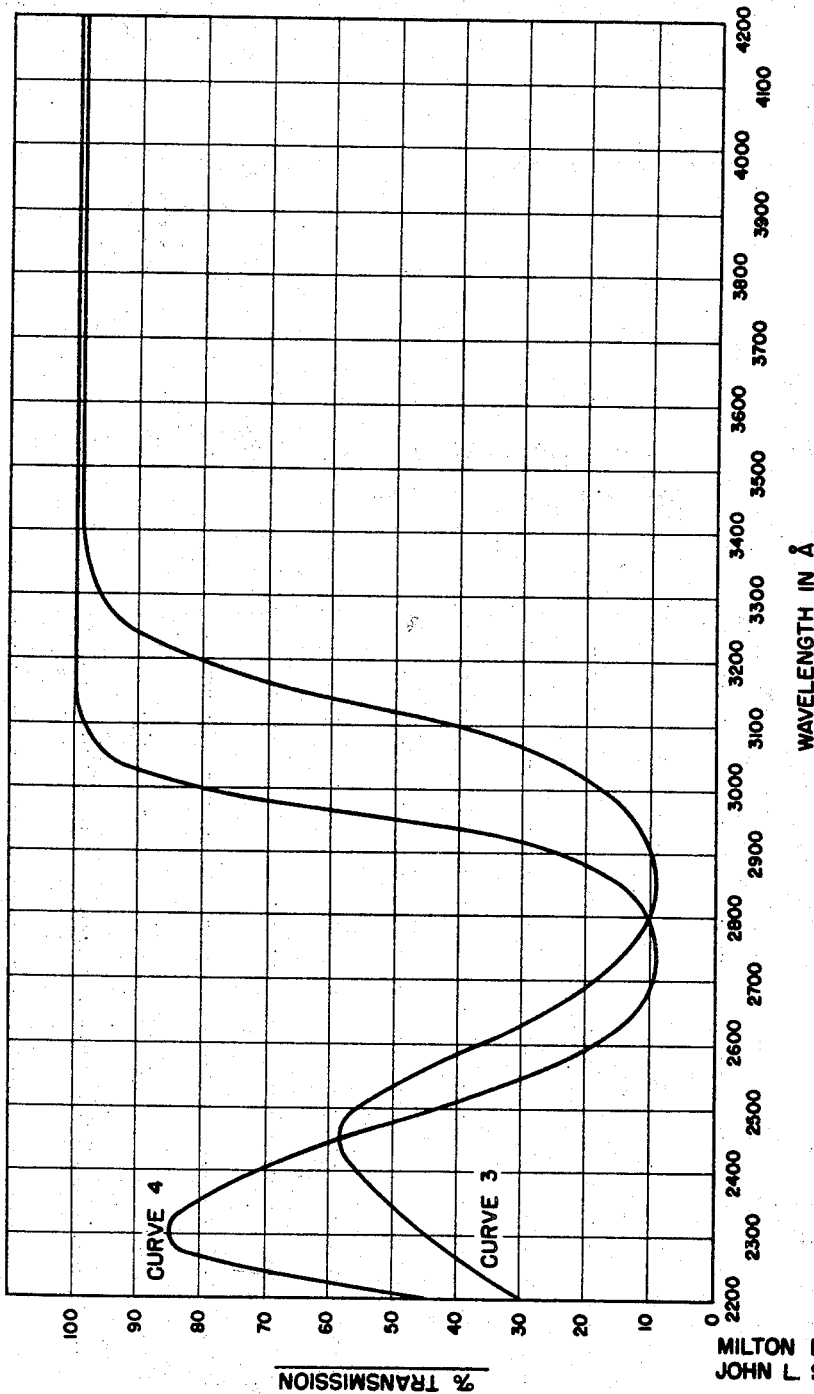

FIGURES 1 and 2 show the ultra-violet transmission characteristics of typical sunscreens of the invention, the percentage of ultra-violet wavelength transmission being plotted against wavelength in A.

In FIGURE 1, curve 1 represents the ultra-violet light transmission of isobutyl N-benzoyl para-aminobenzoate, a sunscreen of the invention, measured in a 1:100,000 dilution in U.S.P. ethyl alcohol. Curve 2 represents the ultra-violet light transmission of isobutyl N-hexanoyl para-aminobenzoate, a sunscreen of the prior art, measured in a 1:100,000 dilution in U.S.P. ethyl alcohol. The latter differs from the former in having an aliphatic group, hexanoyl, in lieu of the benzoyl group.

In FIGURE 2, curve 3 represents the ultra-violet light transmission of n-butyl-N-benzoyl para-aminobenzoate, a sunscreen of the invention, measured in a 1:100,000 dilution in U.S.P. ethyl alcohol. Curve 4 represents the ultra-ivolet light transmission of n-butyl-N-acetyl para-aminobenzoate, a sunscreen of the prior art, measured in a 1:100,000 dilution in U.S.P. ethyl alcohol. The latter differs from the former in having an aliphatic group, acetyl, in lieu of the benzoyl group.

The data upon which these curves are based are given below:

Table 1

| Wave Length Angstrom units (A.) | Percent Transmission | | | |
| --- | --- | --- | --- | --- |
| | Isobutyl N-benzoyl p-amino-benzoate curve(1) | Isobutyl N-hexanoyl p-amino-benzoate curve(2) | n-Butyl N-benzoyl p-amino-benzoate curve(3) | n-Butyl N-acetyl p-amino-benzoate curve(4) |
| 2,200 | 27.7 | 50.1 | 23.2 | 45.4 |
| 2,250 | 36.9 | 75.3 | 32.0 | 74.2 |
| 2,300 | 44.1 | 87.1 | 39.7 | 84.9 |
| 2,350 | 50.8 | 82.5 | 45.7 | 79.7 |
| 2,400 | 55.8 | 74.2 | 52.7 | 70.1 |
| 2,450 | 58.9 | 63.6 | 55.8 | 57.0 |
| 2,500 | 55.8 | 51.1 | 51.7 | 42.5 |
| 2,550 | 45.5 | 38.0 | 41.4 | 29.0 |
| 2,600 | 34.0 | 26.9 | 29.5 | 18.9 |
| 2,650 | 23.1 | 18.7 | 14.1 | 12.5 |
| 2,700 | 15.5 | 14.5 | 12.3 | 9.8 |
| 2,750 | 10.8 | 13.4 | 7.9 | 9.8 |
| 2,800 | 8.2 | 14.6 | 6.1 | 11.2 |
| 2,850 | 7.2 | 17.8 | 5.2 | 14.9 |
| 2,900 | 7.5 | 25.2 | 5.5 | 24.5 |
| 2,950 | 9.9 | 47.2 | 6.9 | 50.9 |
| 3,000 | 14.8 | 77.8 | 11.8 | 82.2 |
| 3,050 | 24.9 | 94.3 | 21.5 | 95.8 |
| 3,100 | 41.44 | 98.8 | 38.5 | 99.4 |
| 3,150 | 62.0 | 99.7 | 59.5 | 99.8 |
| 3,200 | 80.9 | 99.8 | 78.4 | 100.0 |
| 3,250 | 92.0 | 100.0 | 90.9 | 100.0 |
| 3,300 | 98.4 | 100.0 | 96.5 | 100.0 |
| 3,400 | 100.0 | 100.0 | 99.8 | 100.0 |
| 3,500 | 100.0 | 100.0 | 99.9 | 100.0 |
| 3,600 | 100.0 | 100.0 | 99.9 | 100.0 |
| 3,800 | 100.0 | 100.0 | 99.9 | 100.0 |
| 4,000 | 100.0 | 100.0 | 99.9 | 100.0 |
| 4,200 | 100.0 | 100.0 | 99.9 | 100.0 |

The percent transmission of ultra-violet light in the "burning band" (2950–3150 A.) was very small for each of the sunscreens of the invention (curves 1 and 3). At 2950 A., the sunscreens of the invention transmitted only 9.9% and 6.9% of the light, respectively, whereas the prior art sunscreens transmitted 47.2% and 50.9% of the light (curves 2 and 4). The significance of the N-benzoyl group is thus demonstrated. Furthermore, this improvement is obtained without any anesthetic effect. Beyond 2950 A., the harmful wavelengths in the "burning band" are largely screened out, so that tanning, but not burning, can result. The sunscreens of the invention are practically transparent to light beyond 3150 A. so that maximum tanning is obtained from these wavelengths.

Inasmuch as the sunscreens of the invention protect the skin from the effects of ultraviolet light by absorbing the light, as their name implies, they should be applied to the skin in such a way as to form a protective film thereon, through which the light must pass before it can reach the skin. Such a film can be formed upon the skin in various ways, some of which are conventional and well known to those skilled in this art.

The waxy and pasty sunscreens of the invention are film-forming per se, and can be directly applied to the skin, such as in the form of a dusting powder, where they can be spread out by hand to form the film. However, very thin films are usually adequate for protection under most conditions, and such films are more readily obtained if the sunscreen is diluted or thinned out by a liquid or pasty filler or solvent. Any vehicle can be used, preferably of a film-forming nature. Cosmetic creams, pastes, lotions and solutions can be employed as a base for such compositions. The crystalline sunscreens which are not themselves film-forming would ordinarily be applied from such media, desirably with the aid of a film-forming ingredient incorporated therewith.

The concentration of the sunscreen in diluted compositions of this type is not critical, and will depend upon the viscosity of the composition to a large extent. The concentration must be sufficient to provide the necessary protective film upon the skin when an amount of composition is applied to adequately cover the skin before evaporation of volatile solvent or thinner. What amount will appear adequate to the average user is of course quite variable, and the concentration must for safety be gauged by the least amount that would seem enough to such users. The average user frequently judges the amount from the viscosity, since a thick viscous composition will spread further than a thin one, which is more easily spilled and splashed, and dries more quickly. Taking such factors into consideration, it will be found adequate in most cases to employ an amount within the range from about 0.5% to about 10.0% by weight of the composition. Concentrations of from 0.5% to 3.0% are preferred, as giving maximum protection at minimum cost.

Dilute compositions of this type are simple mixtures, dispersions or solutions, and are prepared by simple mixing, solution or dispersion of the ingredients. The sunscreen can be combined therewith in any conveniet order. Where the sunscreen is soluble in the suspending medium, it will be dissolved therein at any stage in the preparation, generally before the insoluble or suspended ingredients are added. Where the sunscreen is insoluble and therefore dispersed or suspended in the medium, it is incorporated with any other such ingredients and the emulsifier if any. Mixing in all cases is adequate to produce a homogeneous solution or dispersion.

The sunscreen lotions generally will contain a film-forming base, a solvent and the sunscreen. The creams will contain a film-forming base (preferably water insoluble), an emulsifier, a stabilizer, water and the sunscreen. A heavy lotion will contain all the liquid ingredients that are present in a cream, but in smaller proportions to increase the viscosity.

Solvents which can be used to prepare lotions in which the sunscreen is in solution include methanol, ethanol, isopropanol, n-butanol, isobutanol, primary amyl alcohol, methyl amyl alcohol, 2-ethylbutanol, 1-hexanol, 2-ethylhexanol, 2,6-dimethyl-4-heptanol, isodecanol, 2,6,8-trimethyl-4-nonanol, undecanol, tetradecanol, heptadecanol, acetone, amyl acetate, oils such as sesame oil, soya bean oil, safflower oil, acetylated lanolin alcohols (Acetulin), lanolin, ethoxylated lanolin, and polyoxethylene sorbitan esters such as the monolaurate, monostearate, and monooleate (Tween 20, 60 and 80). Film-forming bases that may be used include isopropyl myristate, propylene glycol, glycol ethers such as ethylene glycol monomethyl ether (methyl Cellosolve), ethylene glycol monobutyl ether (butyl Cellosolve), glycerin, castor oil, lauryl and oleyl alcohols, glyceryl ricinoleates, ethylene glycol and glyceryl laurates, ethylene glycol and glyceryl stearates, isopropyl stearate, butyl oleate, butyl stearate, ethyl oleate, etc.

To form cosmetic creams or heavy lotions, such solutions are emulsified with suitable oils and fats such as coconut oils, lanolin, palmitates and stearates. In the event the sunscreen is insoluble in the solvent phase, it can be emulsified therein or in the oil or fat.

Typical examples of sunscreen lotions and creams follow. The parts indicated are by weight of the entire composition.

CLEAR LOTION

Example I:

| | Parts |
|---|---|
| Isobutyl-N-benzoyl p-aminobenzoate | 4.0 |
| Ethyl alcohol | 100.0 |
| Water soluble lanolin | 4.0 |
| Isopropyl myristate | 92.0 |
| Color, perfume | q.s. |

Example II:

| | |
|---|---|
| n-Butyl-N-benzoyl p-aminobenzoate | 5 |
| Isopropyl alcohol | 100 |
| Water soluble lanolin | 4 |
| Isopropyl stearate | 100 |
| Color, perfume | q.s. |

Example III:

| | |
|---|---|
| Decyl-N-benzoyl p-aminobenzoate | 8 |
| n-Propyl alcohol | 115 |
| Water-soluble lanolin | 5 |
| Butyl oleate | 110 |
| Color, perfume | q.s. |

The alcohol, lanolin and film-forming base are mixed together at room temperature. The sunscreen is dissolved in this mixture with agitation, and then the color and perfume are added.

HEAVY LOTION

| | Parts | | |
|---|---|---|---|
| Example No. | IV | V | VI |
| Component A: | | | |
| Isobutyl-N-benzoyl p-aminobenzoate | 4.0 | | |
| n-Butyl-N-benzoyl p-aminobenzoate | | 4.0 | 4.0 |
| Isopropyl myristate | 40.0 | 40.0 | 40.0 |
| Glycerol monostearate | 6.0 | 6.0 | 6.0 |
| Stearic acid | 6.0 | 6.0 | 6.0 |
| Propylene glycol | 6.0 | 6.0 | 6.0 |
| Cetyl alcohol | 1.5 | 1.5 | 1.5 |
| Beeswax | 1.0 | 1.0 | 1.0 |
| Sorbic acid | 0.4 | 0.4 | 0.4 |
| Color, perfume | q.s. | q.s. | q.s. |
| Component B: | | | |
| Triethanolamine | 4.0 | 4.0 | 4.0 |
| Water | 132.0 | 132.0 | 132.0 |

Component A was heated to 75° C., and component B previously heated to 80° C. was added slowly to component A with good agitation. Care was taken to minimize air incorporation during the mixing. This system was slowly cooled to about 35° C., at which point the perfume and color were added. The product was then homogenized.

CREAM

| | Parts | | |
|---|---|---|---|
| Example No. | VII | VIII | IX |
| Component A: | | | |
| Isobutyl-N-benzoyl p-aminobenzoate | 4.0 | | |
| n-Butyl-N-benzoyl p-aminobenzoate | | 4.0 | 4.0 |
| Decyl-N-benzoyl p-aminobenzoate | | 4.0 | 4.0 |
| Isopropyl myristate | 40.0 | 40.0 | 40.0 |
| Glyceryl monostearate | 6.0 | 6.0 | 6.0 |
| Stearic acid | 8.0 | 8.0 | 8.0 |
| Propylene glycol | 6.0 | 6.0 | 6.0 |
| Cetyl alcohol | 2.0 | 2.0 | 2.0 |
| Beeswax | 2.0 | 2.0 | 2.0 |
| Sorbic acid | 0.4 | 0.4 | 0.4 |
| Color, perfume | q.s. | q.s. | q.s. |
| Component B: | | | |
| Triethanolamine | 4.0 | 4.0 | 4.0 |
| Water | 128.0 | 128.0 | 128.0 |

The water and triethanolamine solution (component B) was heated to 80° C. and slowly added to component A, which was at 75° C., with good stirring. After emulsion formation, the system was cooled slowly (one-half to one hour) to about 40° C., at which point perfume and color were added. The cream was then homogenized.

The effectiveness of the lotions and creams of Examples I–IX in preventing sunburn was determined using a standardized technique.

The test showed that these compositions are quite effective in preventing sunburn and promoting tanning by absorbing the burning ultra-violet wavelengths and transmitting the beneficial tanning ultra-violet wavelengths. No toxic or anesthetic effects were noted during these tests.

These results were verified by determining the ultraviolet light transmission of the compositions of Examples I, V and VII.

The percent transmission of harmful wavelengths in the "burning band" was quite low and corresponded to that for the sunscreens per se as described in Table I. Beyond 2950 A., sufficient light is absorbed to prevent burning but permit tanning.

We claim:

1. A process for protecting skin from ultra-violet light having a wavelength within the range from 2950 A. to 3150 A. which comprises applying to the skin to be protected a compound of the formula:

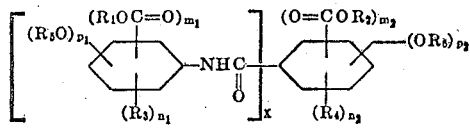

wherein $R_1$ and $R_2$ are selected from the group consisting of hydrogen, alkyl of from 1 to 18 carbon atoms, alkenyl of from 2 to 18 carbon atoms, hydroxyalkykl of from 2 to 18 carbon atoms and from 1 to 6 hydroxyls, etherified hydroxyalkyl of from 3 to 30 carbons and from 1 to 6 ethers, esterified hydroxyalkyl from 3 to 30 carbons and from 1 to 6 esters and hydroxyoxyalkylene of from 1 to about 40 oxyalkylene units, each oxyalkylene unit having from 2 to 18 carbons; wherein $R_3$ and $R_4$ are selected from the group consisting of alkyl of from 1 to 6 carbons and aryl, aralkyl and alkaryl of from 6 to 18 carbons; wherein $R_5$ and $R_6$ are alkyl of from 1 to 6 carbons; wherein $m_1$ and $m_2$ have a value from 0 to 1, at least one of $m_1$ and $m_2$ is 1, and wherein $p_1$ and $p_2$ have a value from 0 to 4, at least one of $p_1$ and $p_2$ is 1, $n_1$ and $n_2$ have a value from 0 to 4, and $x$ has a value from 1 to 5.

2. A process in accordance with claim 1 wherein the compound is applied to skin to form a film through which the light is passed.

3. A sunscreen composition comprising a non-toxic organic film-forming base, an inert nontoxic organic solvent, and from about 0.5 to about 10.0 percent by weight of a compound of the formula:

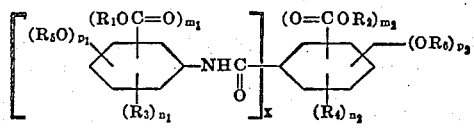

wherein $R_1$ and $R_2$ are selected from the group consisting of hydrogen, alkyl of from 1 to 18 carbons, alkenyl of from 2 to 18 carbons, hydroxyalkyl of from 2 to 18 carbons, hydroxyalkyl of from 2 to 18 carbons and from 1 to 6 hydroxyls, etherified hydroxyalkyl of from 3 to 30 carbons and from 1 to 6 ethers, esterified hydroxyalkyl of from 3 to 30 carbons and from 1 to 6 esters, and hydroxyoxyalkylene of from 1 to about 40 oxyalkylene units, each oxyalkylene unit having from 2 to 18 carbons; wherein $R_3$ and $R_4$ are selected from the group consisting of alkyl of from 1 to 6 carbons and aryl, alkaryl and aralkyl of from 6 to 18 carbons; wherein $R_5$ and $R_6$ are alkyl from 1 to 6 carbons; wherein $m_1$ and $m_2$ have a value from 0 to 1, at least one of $m_1$ and $m_2$ is 1, and wherein $p_1$ and $p_2$ have a value from 0 to 4, at least one of $p_1$ and $p_2$ is 1, $n_1$ and $n_2$ have a value from 0 to 4, and $x$ has a value from 1 to 5.

4. An oil-in-water emulsion sunscreen composition in accordance with claim 3 comprising an emulsifier.

References Cited by the Examiner
UNITED STATES PATENTS

| | | | |
|---|---|---|---|
| 2,104,492 | 1/38 | Merkel | 167—90 |
| 2,202,865 | 6/40 | Piggott | 260—471 |
| 2,269,791 | 1/42 | Shonle | 260—471 |
| 3,306,095 | 12/42 | Valjavec | 260—471 |
| 2,327,899 | 8/43 | Isermann | 260—471 |
| 2,395,665 | 2/46 | Isermann | 260—471 |
| 2,561,468 | 7/51 | Guest | 260—471 |
| 2,689,248 | 9/54 | Clinton | 260—471 |
| 2,820,053 | 1/58 | Hotten | 260—471 |
| 2,853,423 | 9/58 | La Via | 167—90 |
| 2,874,090 | 2/59 | Klein | 167—90 |

OTHER REFERENCES

Chem. Abst., vol. 54, page 6048 (d), 1960, citing Ger. 959,052, February 28, 1957.

LEWIS GOTTS, *Primary Examiner.*

M. O. WOLK, *Examiner.*

UNITED STATES PATENT OFFICE
CERTIFICATE OF CORRECTION

Patent No. 3,175,950            March 30, 1965

Milton E. Abraham et al.

It is hereby certified that error appears in the above numbered patent requiring correction and that the said Letters Patent should read as corrected below.

Column 3, line 22, strike out "glycolpolyoxybutylene oxypropylene"; column 5, lines 65 to 70, the formula should appear as shown below instead of as in the patent:

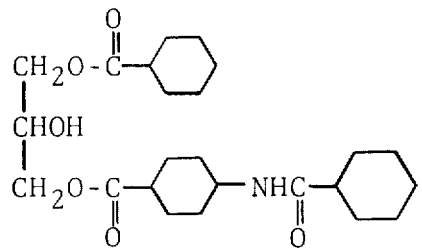

column 6, lines 15 to 20, the formula should appear as shown below instead of as in the patent:

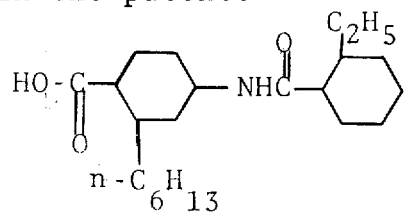

column 7, lines 12 to 19, the formula should appear as shown below instead of as in the patent:

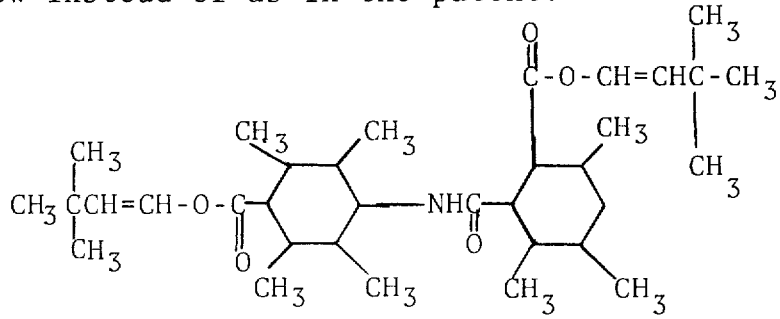

column 7, lines 53 to 64, the formula should appear as shown below instead of as in the patent:

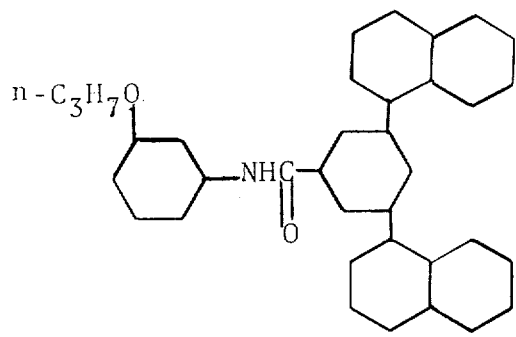

column 10, line 37, for "(116 ml. of" read -- (116 ml.) of --;
column 15, line 14, for "hydroxyalkyl from" read -- hydroxy-
alkyl of from --.

Signed and sealed this 16th day of August 1966.

(SEAL)
Attest:

ERNEST W. SWIDER						EDWARD J. BRENNER
Attesting Officer					Commissioner of Patents